United States Patent [19]
Burroughs et al.

[11] Patent Number: 5,789,100
[45] Date of Patent: Aug. 4, 1998

[54] BATTERY WITH STRENGTH INDICATOR

[75] Inventors: James R. Burroughs, Encino, Calif.; Alan N. O'Kain, Portland, Oreg.

[73] Assignee: Stratetic Electronics, LLC, Reno, Nev.

[21] Appl. No.: 557,598

[22] Filed: Nov. 14, 1995

Related U.S. Application Data

[63] Continuation-in-part of Ser. No. 190,660, Feb. 2, 1994, Pat. No. 5,478,665.

[51] Int. Cl.⁶ .................................................. H01M 10/48
[52] U.S. Cl. .............................. 429/90; 429/92; 429/93; 324/435
[58] Field of Search ........................... 429/90, 91, 92, 429/93; 324/435, 437, 426

[56] References Cited

U.S. PATENT DOCUMENTS

| | | | |
|---|---|---|---|
| 945,564 | 1/1910 | Marko . | |
| 1,010,377 | 11/1911 | Kempf . | |
| 1,497,388 | 6/1924 | Sterling . | |
| 3,563,806 | 2/1971 | Hruden | 136/112 |
| 3,947,978 | 4/1976 | Clark et al. | 35/48 |
| 4,006,414 | 2/1977 | Parker | 324/106 |
| 4,048,388 | 9/1977 | Chevet | 429/91 |
| 4,057,730 | 11/1977 | Dane | 250/461 |
| 4,360,780 | 11/1982 | Skutch, Jr. | 324/437 |
| 4,371,827 | 2/1983 | Mullersman et al. | 320/48 |
| 4,379,816 | 4/1983 | Mullersman et al. | 429/91 |
| 4,497,881 | 2/1985 | Bertolino | 429/91 |
| 4,520,353 | 5/1985 | McAuliffe | 340/636 |
| 4,539,507 | 9/1985 | VanSlyke et al. | 313/504 |
| 4,702,563 | 10/1987 | Parker | 350/351 |
| 4,702,564 | 10/1987 | Parker | 350/351 |
| 4,723,656 | 2/1988 | Kiernan et al. | 206/333 |
| 4,726,661 | 2/1988 | Parker | 350/351 |
| 4,727,006 | 2/1988 | Malinowski et al. | 429/50 |
| 4,737,020 | 4/1988 | Parker | 350/351 |
| 4,769,292 | 9/1988 | Tang et al. | 428/690 |
| 4,775,964 | 10/1988 | Alessio et al. | 368/67 |
| 4,835,475 | 5/1989 | Hanakura et al. | 324/435 |
| 4,835,476 | 5/1989 | Kurosawa | 324/435 |
| 4,855,195 | 8/1989 | Georgopoulos et al. | 429/54 |
| 4,924,176 | 5/1990 | Tremblay | 324/133 |
| 4,962,347 | 10/1990 | Burroughs et al. | 320/48 |
| 5,015,544 | 5/1991 | Burroughs et al. | 429/93 |
| 5,057,383 | 10/1991 | Sokira | 429/92 |
| 5,059,895 | 10/1991 | Cataldi et al. | 324/515 |
| 5,156,931 | 10/1992 | Burroughs et al. | 429/93 |
| 5,223,003 | 6/1993 | Tucholski et al. | 29/623.4 |
| 5,231,356 | 7/1993 | Parker | 324/435 |
| 5,240,022 | 8/1993 | Franklin | 137/1 |
| 5,247,190 | 9/1993 | Friend et al. | 257/40 |
| 5,250,905 | 10/1993 | Kuo et al. | 324/435 |
| 5,405,710 | 4/1995 | Dodabalapur et al. | 428/690 |

FOREIGN PATENT DOCUMENTS

| | | |
|---|---|---|
| 0495636 | 1/1992 | European Pat. Off. . |
| 0523901 | 1/1993 | European Pat. Off. . |
| 3100503 | 8/1982 | Germany . |

OTHER PUBLICATIONS

Scientific American, Jul. 1995, *Plastics Get Wired*, by Philip Yam, pp. 83–87.

*Primary Examiner*—M. Nuzzolillo
*Attorney, Agent, or Firm*—DeLio & Peterson, LLC

[57] ABSTRACT

A battery strength tester used on a battery which has indicating means to indicate the strength of the battery and switching means which can easily be employed to complete a circuit so as to place the indicator means across the terminals of the battery and display the charge of the battery and wherein said switch, after a predetermined interval or temperature is reached, automatically opens to break the electrical contact across the battery terminals. A light emitting material employed as the indicator material is another special feature of the battery strength tester.

16 Claims, 7 Drawing Sheets

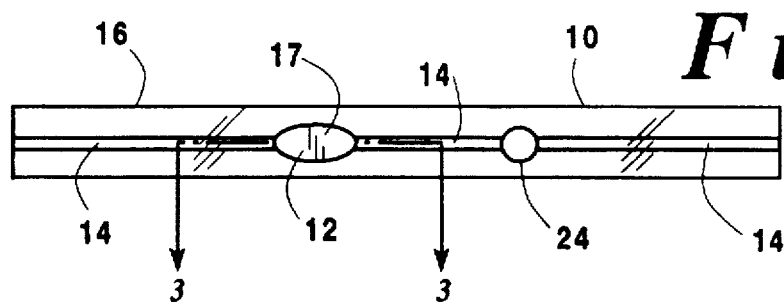
Fig. 1
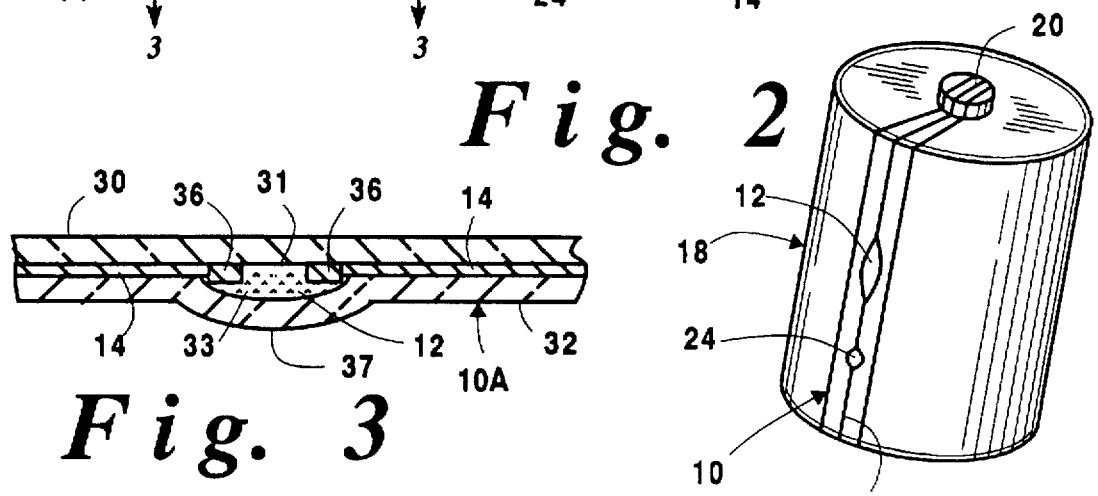
Fig. 2
Fig. 3
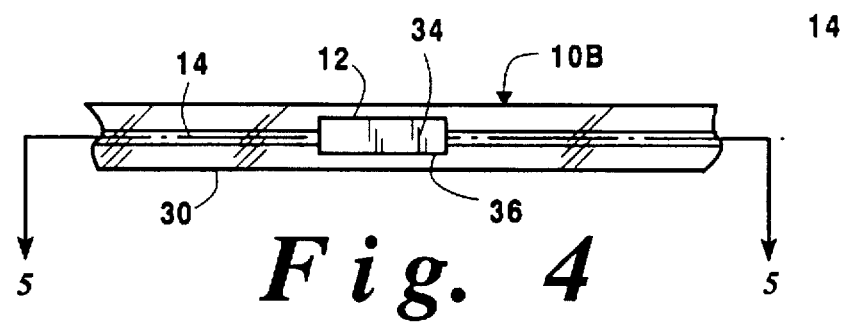
Fig. 4
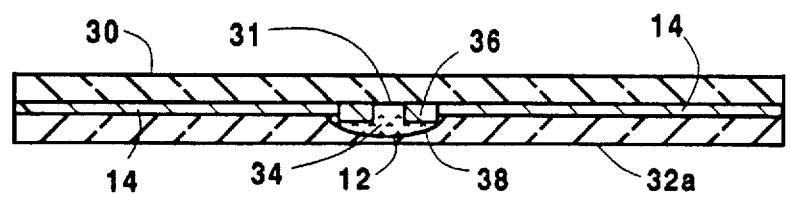
Fig. 5
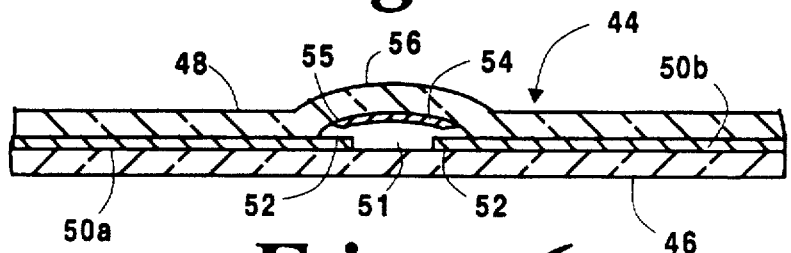
Fig. 6

BATTERY WITH STRENGTH INDICATOR

This is a continuation-in-part of U.S. Ser. No. 08/190,660 filed Feb. 2, 1994, now U.S. Pat. No. 5,478,665.

FIELD OF THE INVENTION

The present invention relates to a battery or battery package having an improved built-in strength tester device for determining the strength, voltage, or capacity of the battery. More particularly, the present invention relates to a battery or battery package having an indicator cell controlled by a switch which, after the switch is turned on, automatically turns off after a predetermined interval, during which interval the user is provided with a visual indication of the strength of the battery.

DESCRIPTION OF RELATED ART

Flashlights, portable lanterns, portable radios and television, cameras, video recorders, portable dictating machines, and the like are used extensively in this country and abroad. Almost every home and business has at least one flashlight or portable lantern and a radio. Many homes and businesses have numerous devices, such as recorders, portable radios and televisions, video recorders, calculators, cameras, and the like, which utilize batteries for their energy source. Some of the devices, such as flashlights, are used on an infrequent basis, that is, during an emergency situation where there has been a power failure or when it is not convenient to use a light source powered by conventional household current, such as for outdoor use or use in an unlighted attic or crawl space. Other devices, such as portable radios, are used extensively. The majority of these battery powered devices use dry-cell nonrechargeable batteries.

Nonrechargeable alkaline batteries sold under the trademarks EVEREADY, DURACELL, RAY-O-VAC, and the like, have a number of advantages over rechargeable batteries. On a weight-to-weight and volume-to-volume basis, the alkaline battery can supply three to four times the wattage of a rechargeable battery. In addition, nonrechargeable dry-cell batteries put out a higher voltage than dry-cell rechargeable batteries. Many dry-cell rechargeable batteries, even if not in use, have to be periodically charged to keep the batteries from falling below a defined charge level to prevent permanent damage to the batteries. Alkaline batteries, which are used frequently, can have a shelf or storage life of from three to five years. During this period, no maintenance of the battery is required. In contrast, most rechargeable batteries wet-cell and dry-cell will completely discharge within six months or less of their last recharge.

Most individuals test their batteries by turning on the device in which the batteries are installed. If the device operates, the individual is normally satisfied that the batteries are operational. Some individuals will test the batteries on a battery tester to determine the condition of the batteries. Some individuals will even test the batteries under both loaded and unloaded conditions to measure the voltage drop. Although it is not complicated to test batteries, it is time consuming to disassemble a device, remove the batteries, test the batteries, and, if they pass the test, reinstall the batteries in the device. It is normally not possible to test new batteries at the time of purchase because of the battery protective packaging.

The manufacturer of DURACELL-brand batteries has been date-marking its packages and batteries to indicate by which date the battery should be in use. Although this date-stamping may be of some benefit to purchasers, it does not tell the purchaser the actual condition of the battery.

A number of patents have issued which relate to "label" battery testers including U.S. Pat. Nos. 5,015,544 and 5,156,931, granted to the assignors of the present invention. Generally, the tester comprises a series of thin layers, generally a substrate layer, onto which is deposited a conductive layer that has an electric current sensitive material in contact therewith, followed by a nonconductive surface layer. When current flows through the conductive layer, the sensitive material is activated and indicates the strength of the battery. The tester is attached to the side of the battery or the battery package and is activated by depressing the tester to connect the battery to the indicator.

In most battery tester designs however, a switch is preferably employed to place the indicator in electrical contact with the battery and the lack of effective and reliable switching devices is a serious problem in the industry. In general the switch is turned on by depressing the switch device to connect two conductors which are connected to the battery terminals. The switch is held in this position until the indicator shows the battery strength at which time the pressure is released and the switch is turned off. This is shown in U.S. Pat. Nos. 5,015,544 and 5,156,931, supra. In U.S. Pat. No. 5,059,895, to Cataldi et al., the switch is turned on by applying pressure on the switch to contact a conductive layer with the surface of the battery through a hole in a dielectric substrate layer. A similar design is shown in U.S. Pat. No. 5,223,003, to Tucholski et. al. All the above patents are hereby incorporated by reference.

U.S. Pat. No. 4,520,353, to McAuliffe disclosed the use of an electronic switch to connect a battery to a test load for a short period of time and then disconnecting the battery before sensing the voltage of the battery.

In a different design, U.S. Pat. No. 5,250,905 shows a battery with a continuous electrochemical tester comprising an indicator cell containing an indicia bearing layer beneath an anode layer and as the anode disappears (is depleted) as the battery is discharged the strength of the battery is indicated.

Accordingly, it is an object of the invention to provide an improved built-in battery-strength tester which has an indicator cell containing a switch in the indicator cell or a separate switching device for the cell which tester permits one to reliably determine in a quick and effortless manner the battery's strength or condition.

It is another object of the invention to provide an improved built-in battery strength tester wherein the tester employs a switch which, after it is activated (turned on), automatically deactivates (turns off) after a predetermined interval is reached.

Other objects and advantages of the present invention will be readily apparent from the following description.

SUMMARY OF THE INVENTION

The above and other objects and advantages, which will be apparent to those skilled in the art, are achieved in the present invention which is directed to, in a first aspect, an improved battery comprising a battery and a battery-strength tester having indicator means controlled by a switching means which switch when activated is adapted to be in the on position for a predetermined interval during which the indicator is electrically connected to the battery and provides an indication of the strength of the battery. After the switch is turned on, for example by pushing and removing one's finger, it automatically turns off after a predetermined interval, during which interval the user is provided with a visual indication of the strength of the battery. The switch means is normally in the off position and in an "on" position electrically connects and completes a circuit between the battery and the indicator means for a desired interval after which it reverts to its original off position. An electronic switch which when activated stays on for a desired interval, e.g., 3–10 seconds, then automatically shuts off may be employed. Any other switching devices which can be controlled for a certain interval may suitably be used. Likewise, any indicator means which can be activated by a flow of electric current may be employed.

In a preferred embodiment shown further herein, the improved battery having a battery strength tester comprises a dry cell battery having a first terminal and a second terminal; a battery indicator formed in a layer attached to a side of the battery which undergoes a visible change when a predetermined electric current flows through the indicator and a first conductor electrically connected between the indicator and the first battery terminal; and a battery switch comprising a resilient, nonconductive, deformable layer disposed over the side of the battery, a switch chamber formed beneath the resilient layer, and a second conductor extending from the chamber and connected to the indicator, the portion of the second conductive lead within the switch chamber comprising a switch contact, the battery switch being biased in an electrically open (off) position. Upon pressing of the resilient layer over the switch chamber, the switch contact will be plastically deformed and placed in electrical contact with a conductive layer in the chamber which is in electrical contact with the second battery terminal, thereby placing the indicator in electrical contact across the terminals of the battery to quickly indicate to the user the strength of the battery. In this improved battery embodiment, the switch conductor contact comprises a shape memory alloy which changes its internal structure at a predetermined temperature and/or interval and reverts to its original undeformed shape, disconnecting the contact and shutting off the switch.

Shape memory alloys are known and have been used in battery indicator devices in place of pyrotechnic materials or color indicating materials as discussed in U.S. Pat. No. 5,015,544, supra. There alloys are sold by TOKI AMERICAN TECHNOLOGIES, Inc. of Irvine, Calif., under the BIOMETAL mark and basically, the alloys change their internal structure at a predetermined temperature and take on an entirely new space. In general, the alloy changes its shape when physically deformed (pressing on the switch) and stays in that position until a particular temperature (e.g., by current flow therethrough) or interval is reached whereupon it reverts to its original undeformed shape.

In another preferred embodiment shown herein, the improved battery having a battery strength tester comprises a dry cell battery having a first terminal and a second terminal; a battery indicator attached to a side of the battery which undergoes a visible change when a predetermined electric current flows through the indicator and a first conductor electrically connected between the indicator and the first battery terminal; and a battery switch comprising a resilient, nonconductive, deformable layer disposed over the side of the battery, a switch chamber formed beneath the resilient layer, a second conductor extending from one end of the chamber to the indicator, and a third conductor extending from the other end of the chamber to the second battery terminal, the battery switch being biased in an electrically open position. Either or both of the second and third conductors being a shape memory alloy and upon pressing of the resilient layer over the switch chamber, the alloy is physically deformed and the second and third conductor make contact and place the indicator in electrical contact across the terminals of the battery to indicate to the user the strength of the battery, and then the alloy releases to its undeformed shape at a predetermined temperature and/or interval to the original off (open) position.

In yet another embodiment, the invention is directed to a strip or label battery strength tester for application to a battery which includes an integral battery-strength indicator or voltmeter which comprises a first nonconductive insulating or dielectric base layer and a conductive layer above and in contact with the base layer. A nonconductive insulating or dielectric layer may be provided over and in contact with the conductive layer. A heat (temperature), current sensitive or other, color indicating material contacts the conductive layer. For a heat sensitive material the conductive layer has sufficient heat generating capacity when subject to a predetermined voltage or current to cause a color change in the temperature sensitive, color indicating material. The conductive layer is preferably formed with a reduced cross sectional area to have a resistance such that current flow at a minimum predetermined voltage through the conductive layer will raise the area to a predetermined temperature. The base layer is of sufficient thickness to provide thermal insulation to overcome heat sinking under the conductive layer and permit the temperature sensitive, color indicating material to function when the strip containing the battery strength indicator or voltmeter is applied to the side or housing of a battery, which battery typically has an electrically conductive housing. The strip comprising the battery-strength indicator or voltmeter also includes a switch means comprising an electronic timing switch and/or a shape memory alloy adapted to make electrical contact with the terminals of the battery for a predetermined interval.

One embodiment of the switch means of the present invention comprises a nonconductive base layer; a resilient nonconductive top layer attached to the base layer, a portion of the top and base layers forming a chamber having first and second internal spaced apart opposing walls; a first conductive contact means on the first internal wall of the chamber; a second conductive contact means on the second internal wall of the chamber; first and second conductive layers independently and separately sandwiched between the top layer and the base layer and connected to the first and second contact means respectively, the top layer about the chamber adapted to be pushed toward the base layer so that the first and second contact means come in contact to permit current to flow from the first conductive means to the second conductive means. Either or both the first and second contact means being a shape memory alloy.

In an alternative embodiment of the switch means of the present invention, the switch means comprises a nonconductive base layer; a resilient nonconductive top layer attached to the base layer, a portion of the top and base layers forming a chamber having first and second internal spaced apart opposing walls; first and second spaced apart conductive contact means on the first internal wall of the switch chamber; third conductive contact means on the second internal wall of the chamber; and first and second conductive means independently and separately sandwiched between the top layer and base layer and connected to the first and second conductive contact means respectively, the top layer about the chamber adapted to be pushed toward the base layer so that the third conductive contact means contacts the first and second conductive contact means to complete an electrical connection with the first and second conductive means. Any one or all of the first, second or third conductive contact means can be a shape memory alloy, with it being preferred that the third conductive contact means be a shape memory alloy.

A battery-strength indicator means which can be used with the present invention comprises a nonconductive base layer; a nonconductive top layer attached to the base layer, a portion of the top layer and base layer forming a chamber therebetween; first and second conductive means separately and independently positioned between the top layer and the base layer and extending into the chamber, the ends of the conductive means in the sealed chamber forming electrodes, the other ends of the conductive means adapted to electrically connect to the battery; and indicator means in the sealed chamber adapted to undergo a visible change when the voltage potential across the electrode exceed or crosses a predetermined voltage. The indicator means can be a liquid-crystal composition that changes phases when the field between the electrodes or plates exceeds or crosses a predetermined voltage value. Preferably the chamber is sealed.

In an alternative embodiment of an indicator which can be used with the present invention, the battery strength indicator means comprises a first nonconductive layer; a second nonconductive layer attached to the first layer, a portion of the first and second layers forming a chamber therebetween, the chamber having first and second internal opposing walls; a third nonconductive layer having a high dielectric constant attached to the first layer; a first conductive plate means sandwiched between the third insulating layer and the first layer and isolated from the chamber; a second conductive plate means on the second internal wall; first and second conductive means separately and independently positioned between the first and third and first and second nonconductive layers, the ends of the conductive means electrically connected to the first and second conductive plate means respectively, the other ends of the conductive means adapted to be electrically connected to the battery; and a liquid-crystal composition in the sealed chamber adapted to undergo a visible phase change when the electric field between the first and second plate means exceeds or crosses a predetermined value. Preferably the chamber is sealed.

In another indicator means which can be used with the switch of the present invention, the battery-strength indicator means comprises a first nonconductive layer; a second nonconductive layer attached to the first nonconductive layer, a portion of the first and second nonconductive layers forming a chamber therebetween; a conductive layer sandwiched between the first and second nonconductive layers, the conductive layer reduced to a small cross-sectional area in the chamber; and a heat sensitive color-indicating material in the sealed chamber that is adapted to undergo a color change when its temperature exceeds or crosses a predetermined value, the conductive layer in the chamber rising to a predetermined temperature when the voltage of the current flowing therethrough exceeds a predetermined value.

Another indicator means which can be used with the switch of the present invention employs materials therein which emit light (illuminate) when the switch is activated and current flows through the indicator. Such materials may be activated by, e.g., heat generated by the current flow or by a voltage potential established between electrodes in the indicator cell.

Examples of such light emitting material include inorganic electroluminescent materials such as phosphors and organic, electrically conductive compounds in an organic crystalline or polymeric film form. The electroluminescent materials undergo a visible change when a predetermined electric current, determined by battery voltage, flows through the indicator. These materials may be applied in layers for attachment to the side of a battery, and may be employed with the switch arrangements disclosed herein.

The invention also comprises an improved battery package having a battery-strength tester means comprising at least one battery; a battery-strength indicator means comprising a battery-strength indicator device for indicating the strength of the battery when electrically connected to the battery; and a predetermined interval (e.g., timing or temperature responsive) switching conductive means adapted to electrically connect the indicator device to the battery; and packaging means for the battery and battery-strength tester means.

The deformable, nonconductive strip layer or layers employed in connection with the battery strength indicator and switch may be made of plastic film such as adhesive tape for application to the battery housing or battery packaging. Preferably the chambers of the battery strength indicators and switches are sealed chambers and the plastic film thermally insulating to prevent heat sinking.

BRIEF DESCRIPTION OF THE DRAWINGS

The features of the invention are believed to be novel and the elements characteristic of the invention are set forth with particularity in the appended clams. The figures are for illustration purposes only and are not drawn to scale. The invention itself, however, both as to organization and method of operation, may best be understood by reference to the detailed description which follows taken in conjunction with the accompanying drawings in which:

FIG. 1 is a top view of a battery-strength tester device of the present invention;

FIG. 2 is a perspective view of a battery of the present invention having a battery-strength tester;

FIG. 3 is a vertical, sectional view along lines 3—3 of FIG. 1 of a typical indicator cell;

FIG. 4 is a top plan view of a battery-strength indicator device;

FIG. 5 is a vertical, sectional view along line 5—5 of FIG. 4;

FIG. 6 is a vertical, sectional view of a switch of the present invention with the switch in the "off" position;

DESCRIPTION OF THE PREFERRED EMBODIMENTS

Figure 7:
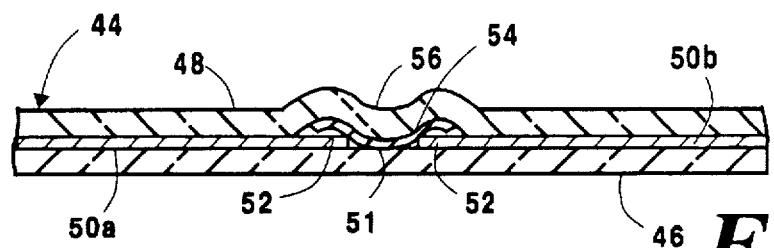
FIG. 7 is a vertical, sectional view of the switch of FIG. 6 with the switch in the "on" position.

In describing the preferred embodiment of the present invention, reference will be made herein to FIGS. 1-20 of the drawings in which like numerals refer to like features of the invention. Features of the invention are not necessarily shown to scale in the drawings.

Referring to FIG. 1, a battery-strength tester device 10 of the present invention is illustrated. The tester device has an indicator chamber, cell or bubble 12 and switch 24 formed in strip 16. Preferably the cells and switches of the present invention are sealed cells. Conductive layers 14 run the length of the strip into the indicator bubble to form spaced apart electrodes. The indicator bubble contains an indicating material 17 which undergoes a visible change (e.g., changes color, emits light, etc.) when the voltage potential across the indicator cell exceeds a predetermined value. At least one side of the strip 16 is transparent or translucent. The switch is in an "off" position, and, thus, the indicator device is only actuated when the switch is "on", thus preventing a constant drain on the battery.

The improved battery 18 of the present invention is illustrated in FIG. 2. The battery has an anode 20 and a cathode at its base (not shown). The tester device 10 is attached to the side of the battery, with the ends of the device connected to the anode 20 and the cathode.

Referring to FIG. 3, a typical indicator device 10A which can be used in the present invention comprises a first layer 30, a second layer 32, and a conductive layer or lead 14 sandwiched between the first and second layers. The end of the conductive leads extend into the indicator chamber or cell 12, which is filled with an indicator material 33. The ends of the conductive leads form electrodes 36. The second layer of the device of FIG. 3 is formed with a bulge 37 which forms one side of the cell. The other side of the cell is formed by the first layer. The first layer can be a clear material, a translucent material, or an opaque material. The second layer is preferably a clear or translucent material. The first layer can be an opaque material as long as the bulge area is clear or translucent. If the first layer is opaque, the inner side 31 of the first layer can be coated with a reflective material such as aluminum or aluminum foil, or a highly reflective white material to enhance visibility of the indicator material.

The indicator material can be any material that will undergo a visible change, such as a color change, when the voltage potential across the electrodes exceeds or drops below a predetermined voltage. For example, the material can be a redox composition, such as the composition in the Sterling U.S. Pat. No. 1,497,388, or the compositions disclosed by H. A. Fales and F. Kenny, INORGANIC QUANTITATIVE ANALYSIS, 1939, pp. 391-393, or the like. Alternatively, the composition can be a liquid-crystal composition, such as one of the compositions disclosed in Kirk-Othmer, ENCYCLOPEDIA OF CHEMICAL TECHNOLOGY, 3rd Ed., John Wiley & Sons, Vol. 7, pp. 724-751 and Vol. 14, pp. 395-427.

The voltage color-indicating device comprises a sealed cell having at least one transparent or translucent window. The cell is filled with an aqueous or nonaqueous composition, such as an aqueous phenolphthalein solution. Two spaced-apart electrodes of the cell are in contact with the color-indicating solution. When a voltage potential is induced across the electrodes, a redox reaction occurs which can cause a color change in the color-indicating solution. Each solution has its own unique threshold voltage wherein the redox reaction will commence. If the voltage of the battery is below that threshold voltage, no redox reaction will occur and there will be no color change.

An alternative embodiment of a battery-strength indicator device 10B which can be used in the present invention is illustrated in FIGS. 4 and 5. The indicator device 10B has a first layer 30, and a second layer 32a, and conductive leads or layers 14 sandwiched therebetween connected to electrodes 36. The second layer 32a has a depression or cavity 38 (filled with an indicator material 34) which defines one side of the indicator cell 12; the other side of the cell being defined by the inner surface 31 of the first layer 30. The cavity is illustrated with curved surfaces, it can also have straight sides arranged in perpendicular or non perpendicular fashion. One or both of the layers are transparent or translucent. Although the drawing illustrates the layers as being relatively thick, in actual practice the layers for the various indicators and of the switches of the invention can be quite thin, such as 1 or 2 mils, with a height or depth of usually 0.5 or 1 mil.

One embodiment of the switch 44 of the present invention is illustrated in FIGS. 6 and 7. The switch 44 has a base layer 46 and a resilient top layer 48, which is attached to the base layer. Conductive leads or layers 50a and 50b are sandwiched between the two layers and form switch contacts 52 which are separated by spacing 51. A portion of the top layer is bulged out to form a bubble element 56. A conductive strip or coating 54 comprising a shape memory alloy such as that marketed under the trademark "BioMetal" is attached to the inner side 55 of the bubble element. The bubble element is biased away from the base layer 46 as shown in FIG. 6 so that the conductive strip or coating does not come in contact with the spaced apart switch contacts 52. Thus, the switch is normally biased in the "off" position. When the bubble element is pressed downwardly towards the base layer as shown in FIG. 7, the conductive strip 54 is plastically deformed so that it contacts the switch contacts 52; thus bridging the contacts and permitting current flow across the contacts between the conductive leads or layers 50a and 50b, as illustrated in FIG. 7. The conductive strip 54 has sufficient resistance so that it heats up as the current passes through it. The strip 54 is sized in relation to the current flow such that when a particular temperature or interval is reached sufficient to activate the shape memory effect, the conductive strip 54 reverts to its original undeformed shape and the bubble element biases away from the base layer, breaking contact between the two switch contacts 52.

Figure 8:
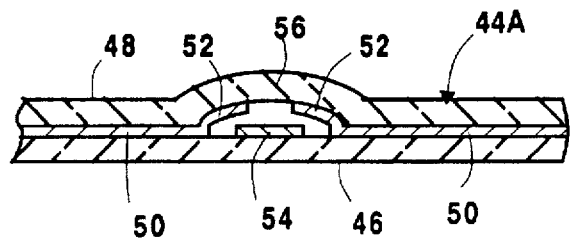
FIG. 8 is a vertical, sectional view of an alternative switch of the present invention.

An alternative embodiment of the switch 44A of the present invention is illustrated in FIG. 8. This switch has a base layer 46, a resilient top layer 48, and conductive leads or layers 50 sandwiched between the two layers. The top layer is bulged out to form a bubble element 56. The spaced apart switch contacts 52 are made of shape memory alloy and are located on the inner sides of the bubble element. A conductive strip 54 or coating is attached to the inner side of the base layer 46. This switch operates in the same manner as does the switch of FIGS. 6 and 7. The bubble element is depressed to deform and permit the switch contacts 52 to make contact with the conductive strip 54; thus, electrically bridging the two contacts. When a particular temperature or interval is reached the shape memory alloy reverts to its original undeformed shape and the bubble element biases away from the conductive strip; thus, breaking electrical contact between the switch contacts and the conductive strip.

Figure 9:
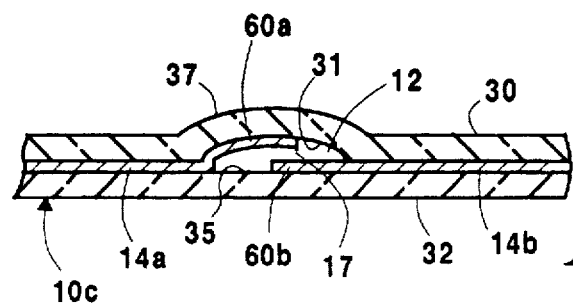
FIG. 9 is a vertical, sectional view of an alternative embodiment of a battery-strength tester of the present invention.

An embodiment of a combined single cell (indicator and switch) battery-strength tester device of the present invention is illustrated in FIG. 9. The device 10C has a first layer 30 and a second layer 32. Conductive layers 14a and 14b are independently and separately sandwiched between the first and second layers on the left and right sides respectively of the device. A portion of the first layer is formed into a bulge 37 to form the indicator cell 12. A shape memory alloy plate 60a is attached to the inner surface 31 of the top layer within the cell and is electrically connected with conductive layer 14a. A second plate 60b is attached to the inner side 35 of the second layer 32 within the indicator cell and is electrically connected to the conductive layer 14b. Second plate 60b may be a shape memory alloy. The indicator cell is filled with an indicator material 17, such as material described herein. At least one of the layers and its attached plate are transparent or translucent (or one of the layers is transparent or translucent and its attached plate is extremely thin) so that changes to the indicator material are visible upon depressing bubble 37 to make contact between the switch contacts 60a and 60b. When a particular temperature or interval is reached the switch contact 60a reverts to its original shape and the bubble element biases away from the base layer, breaking contact in the switch.

Figure 10:
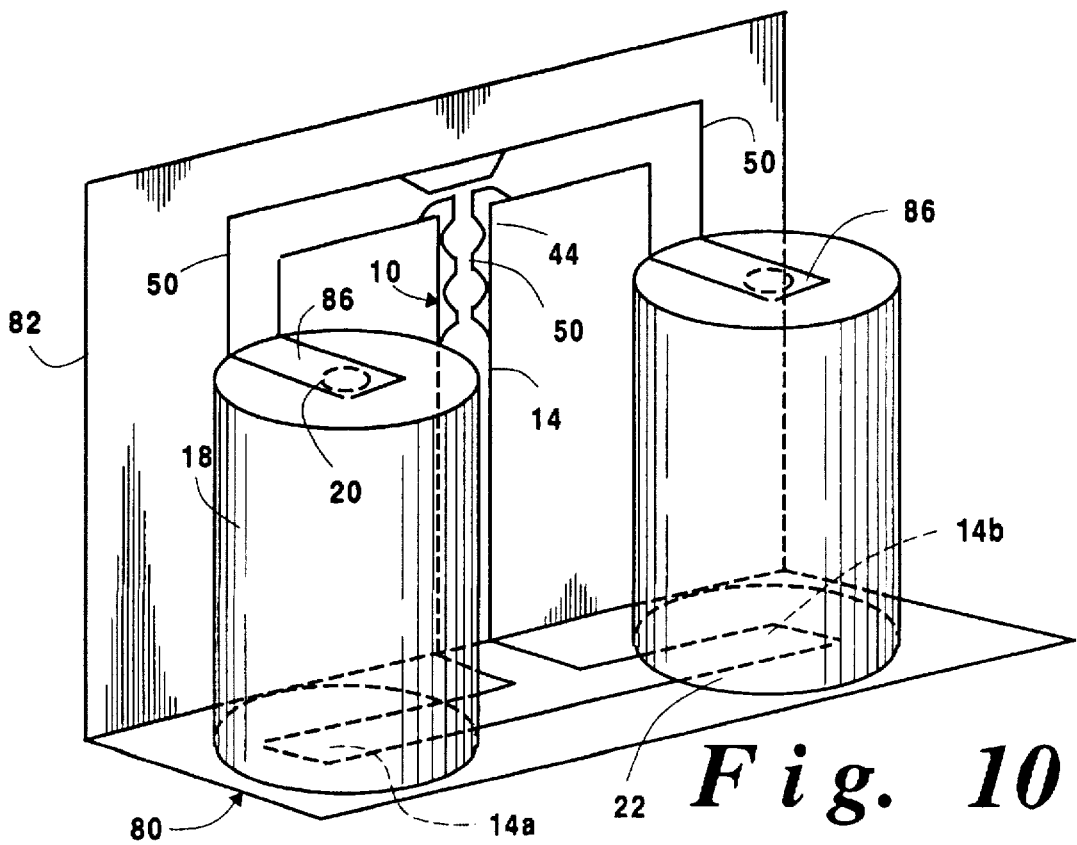
FIG. 10 is a perspective view of the battery packaging of the present invention having a battery-strength tester device.
Figure 11:
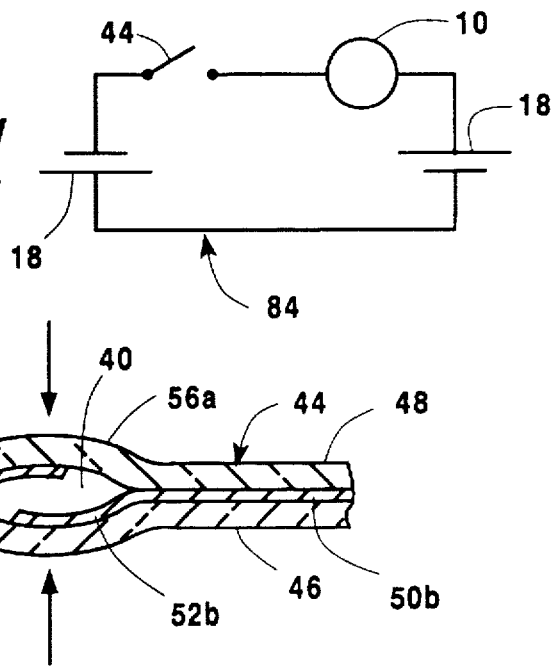
FIG. 11 is a schematic diagram of the battery packaging circuitry of the present invention having a battery-strength tester device.

Another embodiment of the invention is shown in FIGS. 10 and 11. A battery package 80 comprises two batteries 18 mounted on a package frame 82. Conductive leads 14a and 14b are affixed to the base of the frame in electrical contact with the cathode 22 of the battery. A conductive lead 14 connects the leads 14a and 14b with a battery strength-indicator 10, such as the ones described herein. A conductive layer 50 connects the indicator 10 with a switch 44 which in turn is connected to a conductive T-connection 86. Switch 44 after activation automatically turns off after a predetermined interval or temperature is reached. The T-connection is electrically connected to the battery anodes 20 via conductive layer 50 and conductive flaps 86. The package is intended to be covered with a transparent cover giving physical access to the switch 44 and visual access to the indicator 10. In the embodiment of FIG. 10 the batteries are in parallel. FIG. 11 illustrates the circuitry of a battery package containing two batteries that are connected in series to the switch 44 and indicator 10.

In the preferred embodiment the conductive leads, switch and indicator are layers attached to the package frame. The conductive leads may be printed or silk screened directly on the package frame. The package frame can be the base nonconductive layer for the switch 44 and indicator 10.

Figure 12:
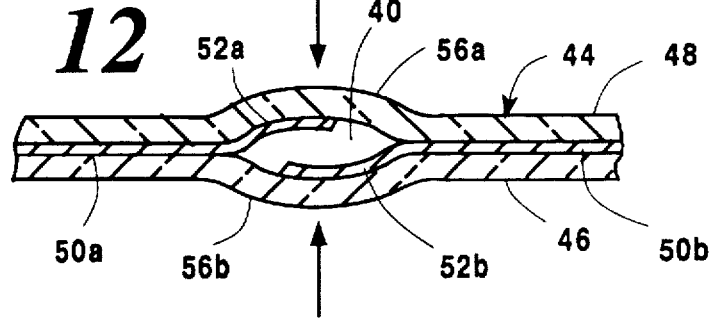
FIG. 12 is a vertical, sectional view of an alternative embodiment of the switch of the present invention.

Another embodiment of the switch 44 of the present invention is illustrated in FIG. 12. The switch has a base layer 46 and a top layer 48, which is attached to the base layer. Conductive leads or layers 50a and 50b are sandwiched between the two layers. The conductive layer 50a on the left side of the device is formed into switch contact 52a in chamber 40 and the conductive layer 50b on the right side of the device is formed into switch contact 52b in the chamber. Switch contact 52a and/or 52b are a shape memory alloy. A portion of the top layer and bottom layer are bulged out to form bubble elements 56a and 56b. The bubble elements are biased away from each other so that the switch contacts do not come in contact. Thus, the switch is normally in the "off" position. When the bubble elements are pressed together as shown by the arrows in FIG. 12, the switch contacts deform and come in contact permitting current flow across the contacts and the conductive leads or layers 50a and 50b. When a particular interval or temperature is reached, the bubble elements undeform and bias away from each other, breaking contact between the two switch contacts.

Figure 12A:
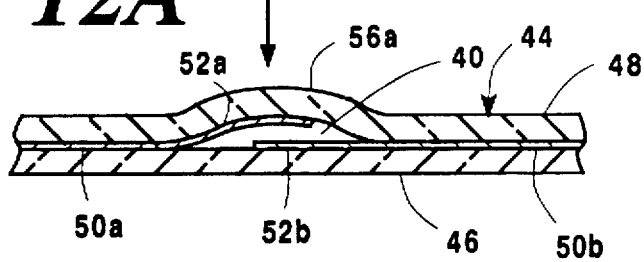
FIG. 12A is a vertical sectional view of a switch of the present invention with the switch in the "off" position.
Figure 12B:
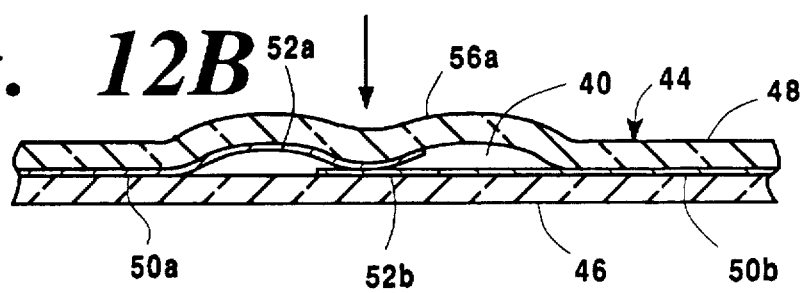
FIG. 12B is a vertical view of the switch of FIG. 12A with the switch in the "on" position.

Another switching embodiment 44 of the present invention is shown in FIGS. 12A and 12B. The switch has a base layer 46 and a top layer 48, which is attached to the base layer. Conductive leads or layers 50a and 50b are sandwiched between the two layers. The leads may be a shape memory alloy and in this switch the conductive layer 50a is a shape memory alloy and is formed into switch contact 52a in chamber 40. The conductive layer 50b is formed into switch contact 52b in the chamber. A portion of the top layer is bulged out to form bubble element 56a. The switch contacts 52a and 52b are shown biased away from each other so that the switch is in the off position. When the bubble element is pressed as shown by the arrow in FIG. 12B the switch contacts come in contact permitting current flow across the contacts and the conductive leads or layers 50a and 50b. When a particular temperature or interval is reached, the switch contact 52a reverts to its original undeformed shape (as shown in FIG. 12A), breaking the contact and turning the switch off.

The present invention permits the user of a battery to quickly determine whether the capacity of the battery is above or below a given point without the use of a voltmeter and/or ammeter. The approximate capacity of a battery can be determined by the battery's no load output voltage. The indicator device of the present invention can be fabricated so that it indicates a particular no-load voltage threshold. For example, one can select a voltage threshold which is indicative that the battery is about 20% exhausted, or about 50% exhausted—whatever is suitable for the intended purpose.

Another indicator useful with the switches of the invention is one having a liquid-crystal composition comprises a sealed, fully-enclosed cell containing the liquid-crystal composition. Preferably, one side of the cell will be transparent, and not merely translucent. The base layer of the liquid-crystal indicator call can be a high-dielectric material, optionally coated with a dielectric mirror in contact with the liquid-crystal composition. The top layer is preferably transparent and, optionally, has a transparent, conductive coating applied to the surface in contact with the liquid-crystal composition. A voltage differential is induced across the liquid-crystal composition to either the base high-dielectric material or the high-dielectric transparent top layer to induce an electric field. An electric field change can cause changes in the optical properties of liquid crystals, such as when a liquid crystal changes from a nematic phase to a smectic phase. Such field are easily achieved, even with small voltage inputs from batteries. by employing a high-dielectric base material and/or a high dielectric top layer material. Thus, when the liquid-crystal detector of the present invention is in a non-energized state, it will have one optical appearance characteristic of the 'at rest' phase of the liquid crystal. When the indicator device is activated, and a field is generated across the liquid-crystal composition, the liquid-crystal composition will transform into another phase. Alternatively, the indicator can remain in an "always on" condition and provide a constant indication of battery strength. If batteries do not have sufficient voltage to achieve the threshold high-dielectric field, thereby changing the liquid-crystal composition from one phase to the other, no change will be observed. Thus, each liquid-crystal indicator cell will be tailored by controlling the thickness of the dielectric material in the sandwich, the distance between the plates or electrodes, and the dielectric composition. Typical liquid-crystal compositions that can be employed include methoxybenzylidenebutylaniline and terephthal-bis-p-butylaniline.

Figure 13:
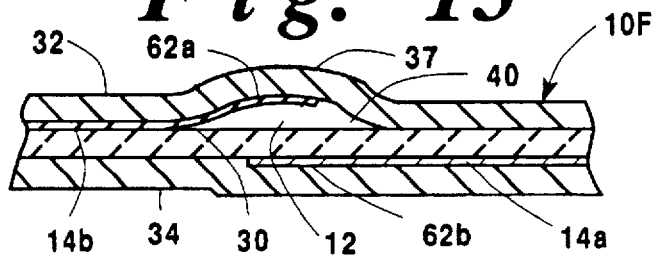
FIG. 13 is a vertical, sectional view of another embodiment of a battery-strength indicator device useful with the present invention.

In the indicator device of FIG. 13, the electrodes 62b and 62a are independently and separately sandwiched between the first high dielectric constant layer and the third nonconductive layer 30 and 34 and the first layer and second nonconductive layers 30 and 32, respectively. A bulge extending outwardly from the first layer is formed in the second layer to form an indicator cell 40. Within the cell on the inner side of the second layer 32 is a conductive plate 62a electrically connected to lead 14b. Plate 62b is positioned below the indicator cell between the first and third layers and is electrically connected to conductive layer 14a. The indicator cell 12 is filled with a liquid-crystal composition 40. The second layer and plate 62a and/or the first and third layers and plate 62b are transparent or translucent so that changes to the liquid-crystal composition 40 are visible. The bottom of the chamber can include a highly reflective coating or the like to enhance observation of the changes to composition 40. It should be appreciated that any switch indicator material may be used in the indicator cell of FIG. 13 or any other cell design. For example, a light emitting material may be used which is activated by heat, current flow, voltage differential, etc., and combinations thereof.

Other constructions of battery strength indicators and control switches are contemplated within the scope of this invention. For example, an indicator can be fabricated with conductive top and base layers which sandwich a nonconductive layer. A cell is formed between the top and bottom layers as described herein. The nonconductive layer does not extend into the cell; this layer, however, does electrically insulate the top layer from the bottom layer. The cell is filled with an indicator material as described herein and the top and bottom layer are independently adopted to be connected to different poles of a battery. The top and/or bottom layer are transparent or translucent.

Figure 13A:
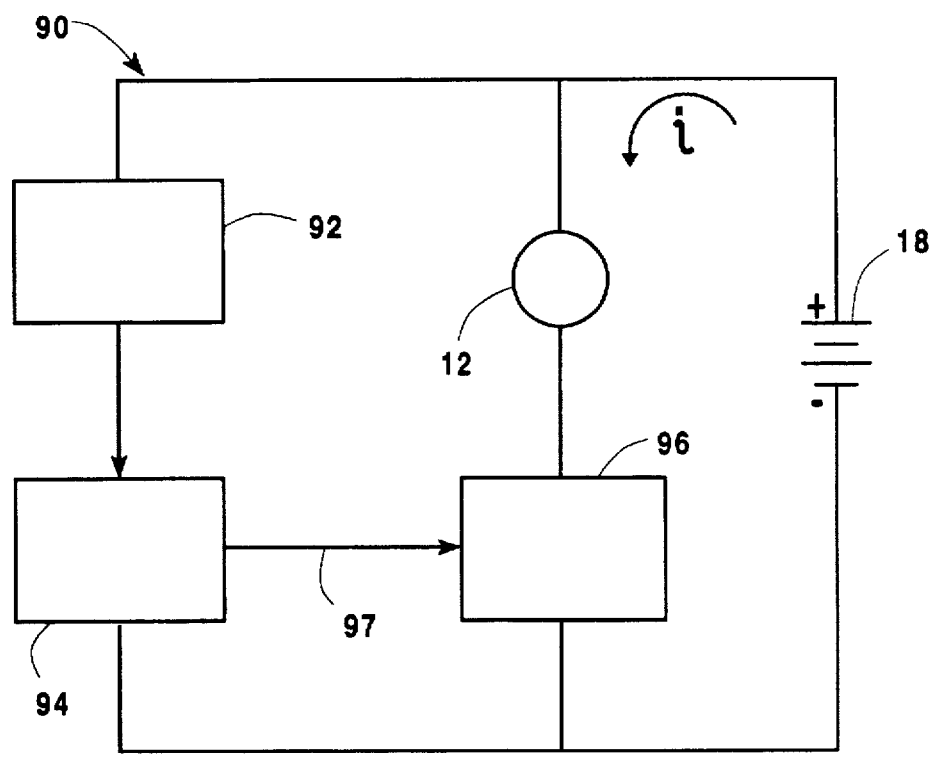
FIG. 13A is a block diagram of a control circuit of the present invention.

In accordance with the present invention, FIG. 13A shows control 90 for an electronic switch which when actuated, effects a circuit comprising indicator device 12 and battery 18 so as to provide an indication of the strength of the battery. After a predetermined interval of time expires, control 90 breaks or opens the circuit comprising indicator device 12 and battery 18. Control 90 comprises momentary switch 92, timing circuit 94 and switch circuit 96. When switch 92 is depressed for a few seconds, timing circuit 94 charges up to a voltage substantially equal to the voltage of battery 18 and transfers this voltage potential via output line 97 to switching circuit 96. The voltage potential of output line 97 remains above a predetermined threshold for a predetermined amount of time determined by timing circuit 94. Switch circuit 96 effects a complete circuit comprising indicator device 12 and battery 18 for the amount of time that the voltage of output line 97 is at or above the predetermined threshold. Thus, during the period of time that the voltage potential is at or above the predetermined threshold voltage, a current i will flow from the positive terminal of battery 18 through indicator device 12, through switch circuit 96 and into the negative terminal of battery 18 so as to allow indicator device 12 to indicate the strength of battery 18. Once the voltage potential on line 97 falls below the predetermined threshold, switch circuit opens or breaks the circuit comprising battery 18 and indicator device 12. Preferably, the interval of time during which the voltage potential of line 97 is at or above the predetermined threshold is between about 3 and 10 seconds, inclusive.

Figure 14:
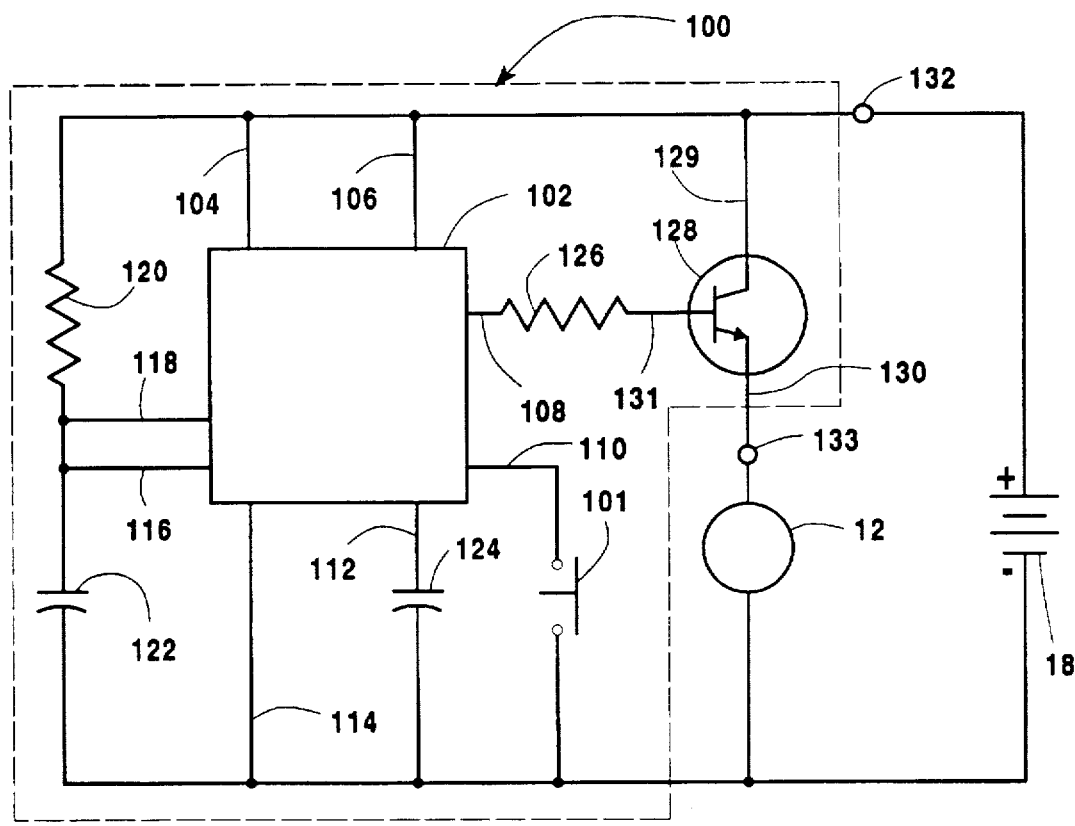
FIG. 14 is a circuit diagram of a one embodiment of the control circuit of FIG. 13A.
Figure 16:
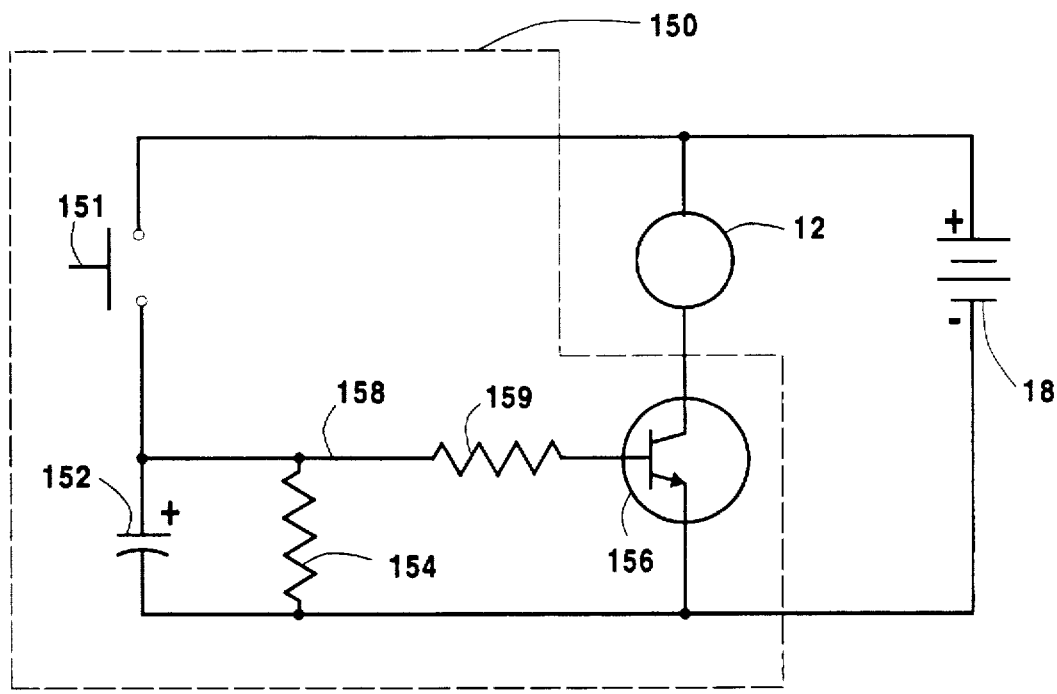
FIG. 16 is a circuit diagram of a preferred embodiment of the control circuit of FIG. 13A.

Control 90 may be realized by a variety of configurations. FIGS. 14 and 16 show two (2) configurations for realizing the control shown in FIG. 13A. The preferred configuration is shown in FIG. 16. The configurations of FIGS. 14 and 16 will now be discussed.

Referring to FIG. 14, there is shown control 100 that is configured so that after activation, it automatically turns off after a predetermined time interval. Control 100 comprises momentary switch 101, timer 102, resistor 120, capacitors 122, 124, resistor 126 and transistor 128. Momentary switch 101 can be configured as switch 44 described above. Transistor 128 is preferably an NPN switching transistor. In a preferred embodiment, transistor 128 is a 2N2222 transistor. Transistor 128 has collector 129 coupled to terminal 132, emitter 130 coupled to terminal 133 and base 131 coupled to one end of resistor 126. The positive terminal of battery 18 is coupled to terminal 132. Indicator device 12 is coupled between terminal 133 and the negative terminal of battery 18.

Timer 102 is preferably a LM555 timer which is an 8-pin mini dual in-line package (DIP) and is available from National Semiconductor, Texas Industries and Advanced MicroDevices. Timer 102 comprises the following terminals:

| Terminal | Function |
| --- | --- |
| 104 | Supply Voltage (4.5 to 15v d.c.) |
| 106 | Reset |
| 108 | Output |
| 110 | Trigger |
| 112 | Control Voltage Input |
| 114 | Ground Potential |
| 116 | Discharge |
| 118 | Threshold |

The supply voltage applied to terminal 104 is preferably between about 4.5 and 15V DC. However, the actual voltage supplied to terminal 104 is the voltage available from battery 18. The supply current is between about 3 and 6 ma (milliamp) when the supply voltage is about 5 volts d.c. When the supply voltage is about 15 volts, the supply current is between about 10 to 15 ma. Referring to FIG. 14, terminals 104 and 106 are coupled to terminal 132 which is coupled to the positive terminal of battery 18. Resistor 120 is coupled between terminals 104 and 118 of timer 102. Resistor 120 preferably has a resistance between about 100 kohms (kilo-ohms) and 1 Mohms (megaohms). However, the choice of a resistance value for resistor 120 will be discussed below. Capacitor 122 is coupled between terminals 114 and 116 of timer 555. Capacitor 122 preferably is a polarized electrolytic capacitor. However, the choice of a capacitance value for capacitor 122 will be discussed below. Terminal 114 is also coupled to the negative terminal of battery 18. Capacitor 124 is coupled between terminal 112 and the negative terminal of battery 18. Capacitor 124 preferably has a capacitance of about 0.01 uf. Terminal 110 is coupled to one pole of momentary switch 101. The second pole of switch 101 is coupled to the negative terminal of battery 18. Terminal 108 is coupled to one end of biasing resistor 126. Resistor 126 preferably has a resistance of about 1 kohms. The other end of resistor 126 is coupled to base 131 of transistor 128.

Figure 15:
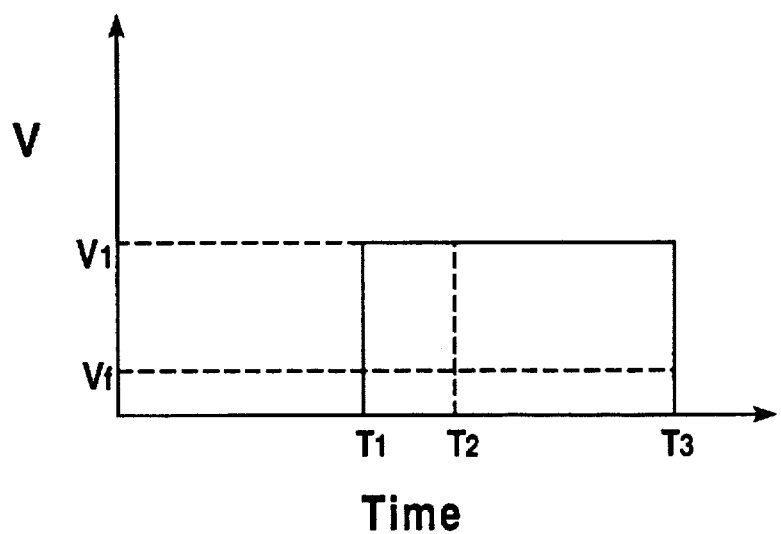
FIG. 15 is a graph of the operating characteristics of the embodiment of FIG. 14.

Referring to FIGS. 14 and 15, when momentary switch 101 is depressed, trigger terminal 110 of timer 102 becomes coupled to the negative terminal of battery 18. In response, timer 102 outputs the pulse shown in FIG. 15 on terminal 108. The pulse has an amplitude of $V_1$ volts which is determined by the voltage potential of battery 18. Resistor 126 effects a relatively small voltage drop there across. When the voltage at base 131 of transistor 128 reaches voltage $V_f$, the base-emitter junction of transistor 128 becomes forward biased creating a conductive path between collector 129 and emitter 130. Thus, a conductive path is established between terminals 132 and 133. For an NPN transistor such as the 2N2222, $V_f$ is between about 600 and 750 mv (millivolts). Therefore, when transistor 128 is forward biased, a circuit is formed whereby current flows from the positive terminal of battery 18, through the collector-emitter junction of transistor 128, through indicator device 12 and into the negative terminal of battery 18.

An important feature of control 100 is that the user need only depress momentary switch 101 for a moment in order to test battery 18. As shown in FIG. 15, if switch 101 is depressed for an amount of time equal to the difference between time $T_1$ and time $T_2$, e.g. $T_2-T_1$, the pulse on terminal 108 continues to have an amplitude of $V_1$ volts until a point in time designated by time $T_3$. Thus, although switch 101 is depressed for an amount of time defined by $T_2-T_1$, the circuit comprising battery 18 and indicator 12 remains complete until time $T_3$. The time period starting at $T_2$ and ending at $T_3$ is a time delay $T_{D1}$ that is defined by a time constant $\tau=R_{120}\times C_{122}$ (s) where $R_{120}$ denotes the resistance of resistor 120, $C_{122}$ denotes the capacitance of capacitor 122, "x" denotes multiplication and "s" denotes seconds. Thus, resistor 120 and capacitor 122 control the time delay $T_{D1}$. For example, if the desired delay $T_{D1}$ is about 5 seconds, then it is preferred that $C_{122}$ have a capacitance of about 50 uf and resistor 120 have a resistance of about 100 kohms. During the time delay period defined by $T_{D1}$, current flows through indicator device 12 which indicates the strength of battery 18 as described above.

When transistor 128 is biased "on" (when the voltage potential at the base of transistor 128 is at or above $V_f$) a conductive path is established between the collector and emitter. When transistor 128 is on, a voltage drop occurs across the collector-emitter junction of transistor 128. Thus, indicator device 12 is preferably calibrated to take into account the voltage drop across the collector-emitter junction.

FIG. 16 shows a preferred control 150 that comprises momentary switch 151, capacitor 152, resistor 154 and transistor 156. Momentary switch 151 has one pole coupled to the positive terminal of battery 18, and another pole coupled to the positive end of capacitor 152, one end of resistor 154 and the base of transistor 156 so as to define node 158. The other ends of capacitor 152 and resistor 154 and the emitter of transistor 156 are coupled to the negative terminal of battery 18. Resistor 154 controls the discharge rate of capacitor 152. Resistor 159 is coupled between node 158 and the base of transistor 156 and limits the current flowing through the base-emitter junction of transistor 156. The collector of transistor 156 is coupled to one end of indicator device 12. The other terminal of indicator device 12 is coupled to the negative terminal of battery 18. Capacitor 152 is preferably a polarized electrolytic capacitor. The capacitance and resistance values of capacitor 152 and resistor 154, respectively, will be discussed below. Transistor 156 is preferably a 2N2222 switching transistor.

Figure 17:
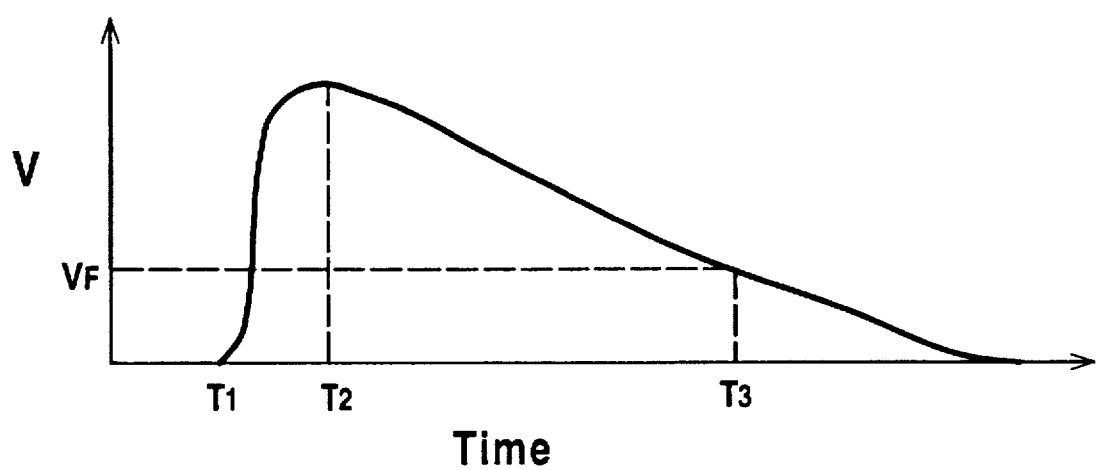
FIG. 17 is a graph of the operating characteristics of the embodiment of FIG. 16.

Referring to FIG. 17, when momentary switch 151 is depressed during the time period defined by the time from time $T_1$ to time $T_2$, capacitor 152 charges up to a voltage which is substantially equal to the voltage available from battery 18. Capacitor 152 and resistor 154 define a timing circuit which produces a time delay $T_{D2}=T_3-T_2$. When the voltage of capacitor 152 reaches voltage $V_f$, the base-emitter junction of transistor 156 becomes forward biased thereby completing a circuit comprising battery 18 and indicator device 12. $V_f$ is typically between about 600 and 750 mv (millivolts). This circuit comprising battery 18 and indicator device 12 remains complete until time $T_3$. During the time period from time $T_2$ to time $T_3$, current flows through indicator device 12 which indicates the strength of battery 18 as described above. The time period or time delay $T_{D2}$ is determined by the discharge rate of capacitor 152. The discharge rate of capacitor 152 is controlled by resistor 154. As the resistance value of resistor 154 increases, the time for capacitor 152 to discharge increases. The time delay $T_{D2}$ is defined as a time constant $T=R_{120}\times C_{152}(S)$. Thus, if the desired delay $T_{D2}$ is about 5 seconds, then it is preferred that $C_{152}$ have a capacitance of about 10 uf and resistor 120 have a resistance of about 5 Mohms (megaohms). During the time delay $T_{D2}$, current flows through indicator device 12 which indicates the strength of battery 18 as described above. Thus, when the time delay $T_{D2}$ of 5 seconds expires, capacitor 152 has a voltage potential that is below $V_f$ which effects turning "off" transistor 156 thereby creating an open circuit. Thus, when transistor 156 is turned "off", no current flows through indicator device 12.

When transistor 156 is biased "on" (when the voltage potential at the base of transistor 156 is at or above $V_f$), a conductive path is established between the collector and emitter. When transistor 156 is "on", a voltage drop occurs across the collector-emitter junction of transistor 156. Thus, indictor device 12 is preferably calibrated to take into account the voltage drop across the collector-emitter junction.

Figure 18:
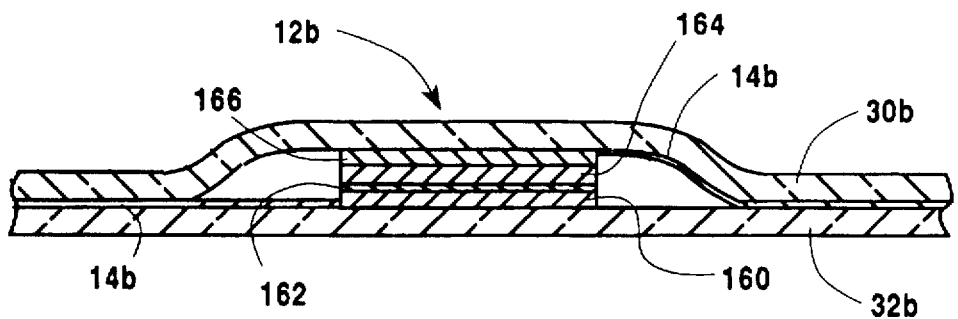
FIG. 18 is a vertical, sectional view of one embodiment of an inorganic luminescent battery-strength indicator employing a phosphor for use in the present invention.

A variety of light-emitting indicators which undergo a visible change when the voltage applied to the indicator crosses a predetermined value may be used in connection with the present invention as indicator 12. In addition to those indicators previously described, LED indicators may be employed, as well as the inorganic electroluminescent layer disclosed in U.S. Pat. No. 4,775,964, which patent is hereby incorporated by reference. An example of the latter is an electroluminescent layer of a phosphor in a binder such as an epoxy resin which separates two (2) electrodes to form what is essentially a capacitive circuit element. When an alternating or pulsed voltage is applied across the two electrodes, the phosphor will illuminate or emit light in various colors depending on the phosphor employed. Generally, the phosphor materials are about 10 to 25 microns and the polymeric binder is an epoxy resin (e.g., of the bisphenol—A class) which exhibit low electrical losses and moisture resistant qualities when cured. An example of a phosphor/binder mixture comprises 2.5 parts GTE Sylvania No. 727 phosphor, screened and graded to particle sizes between 10 to 25 microns, mixed with one part, by volume, of a heat curable bisphenol—A epoxy binder, commercially obtainable as ABELBOND 681-14 from Abelstick Laboratories. FIG. 18 depicts battery strength indicator 12b having a nonconductive, high dielectric base layer 32b for attachment to the side of a battery. Covering the indicator is transparent nonconductive, high dielectric protective layer 30b of a plastic. Conductive layer 14b extends between layers 30b and 32b for connecting the indicator to the terminals of the battery when the switch is activated. Between layers 30b and 32b are, in sequence from the bottom, electrically conductive layer 160 of a metallic film such as aluminum connected to layer 14b, electrically insulating layer 162 of a dielectric such as barium titanate or an acrylic resin to physically and electrically isolate conductive layer 160 from the next upper layer 164, electroluminescent layer 164 of luminescing phosphor particles in a polymeric binder such as an epoxy binder, and electrically conductive layer 166 of a metallic film such as indium tin oxide connected to layer 14b.

Another example of suitable light emitting conductors are conductive organic molecules or polymers which form organic electroluminescent (EL) devices. These have been produced as single crystals and as thin films of up to about 5 microns thickness, and have been disclosed in the following U.S. Pat. Nos. 3,172,862, 3,173,050, 3,382,394, 3,530, 325, 3,359,445, 3,621,321, 3,710,167, 3,772,556, 3,995,299, 4,356,429, 4,539,507, 4,672,265, 4,720,432, 4,769,292, 4,885,211, 5,405,710 and 5,247,190, the disclosures of which are hereby incorporated by reference. An example of a class of conductive, crystalline organic molecule useful a host material in such devices is a metal chelated oxinoid compound such as 8-hydroxyquinoline aluminum, disclosed in the aforementioned U.S. Pat. No. 4,769,292. The host material may be blended with a fluorescent material capable of emitting light in response to hole-electron recombination within the host organic luminescent medium, for example, fluorescent coumarin dyes which fluorescent materials and dyes are more fully listed in the '292 patent. Suitable polymeric organic compounds for EL devices include semi-conductive conjugated polymers such as poly-p-phenylenevinylene (PPV) and its derivatives, disclosed in the aforementioned U.S. Pat. No. 5,247,190. Other useful conjugated polymers disclosed in the '190 patent include poly(phenylene) polymers, poly(4,4'-diphenylenediphenylvinylene) (PDPV) polymers, poly(1,4-phenylene-1-phenylvinylene) polymers, poly(1,4-phenylenediphenylvinylene), poly(3-alkylthiophene) polymers, poly(3-alkylpyrrole) polymers, poly(2,5-dialkoxy-p-phenylenevinylene) polymers and poly(phenylacetylene) polymers.

Figure 19:
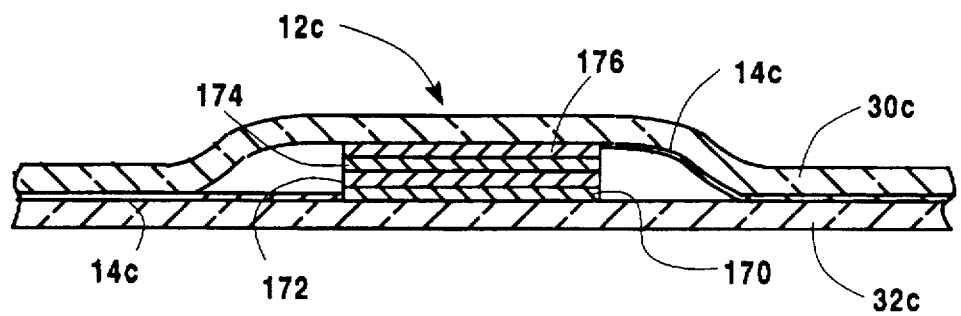
FIG. 19 is a vertical, sectional view of another embodiment of an organic luminescent battery-strength indicator employing a crystalline electrically conductive organic compound for use in the present invention.

A preferred crystalline organic EL device 12c for use in the present invention is shown in FIG. 19 wherein a nonconductive, high dielectric base layer 32c for attachment to the side of a battery supports, in sequence, a cathode layer 170 of an electrically conductive metal or metal oxide such as a magnesium/silver alloy, a layer 172 of an organic material chosen for its electron transporting efficiency such as tris(8-quinolinol)aluminum with a fluorescent material, a layer 174 of an organic material chosen for its hole transporting efficiency, for example an aromatic tertiary amine such as 1,1 bis(4-di-p-tolylaminophenyl)cyclohexane, followed by a light transmissive anode layer 176 of an electrically conductive metal or metal oxide such as indium tin oxide. The luminescence occurs primarily in layer 174, which is comprised of the aforementioned host and fluorescent materials. Overlying the anode layer is transparent nonconductive, high dielectric protective layer 30c of a plastic. Conductive layer 14c between layers 30c and 32c connect layers 170 and 176 to the respective terminals of the battery when the switch is activated. Alternatively, organic EL indicator 12c may have electron and hole transport layers 172, 174, respectively, adjacent a microcavity of reflective surfaces as disclosed in U.S. Pat. No. 5,405,710, the disclosure of which is hereby incorporated by reference.

Figure 20:
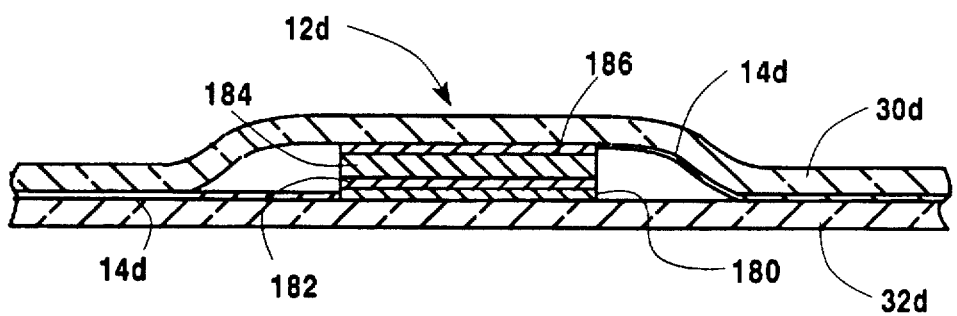
FIG. 20 is a vertical, sectional view of another embodiment of an organic luminescent battery-strength indicator employing a polymeric electrically conductive organic compound for use in the present invention.

A preferred polymeric organic EL indicator 12d is shown in FIG. 20 in which there is depicted a nonconductive, high dielectric base layer 32d for attachment to the side of a battery. Sequentially over the base layer is charge injecting contact layer 180 of metallic film such as aluminum, electron injecting contact layer 182 of metallic oxide such as aluminum oxide, PPV layer 184, and second charge injecting contact layer 186 of a light transmissive metallic layer such as aluminum or gold. Overlying charge injecting contact layer 186 is transparent nonconductive, high dielectric protective layer 30d of a plastic. Conductive layer 14d between layers 30d and 32d connect layers 180 and 186 to the respective terminals of the battery when the switch is activated.

All of these LED, inorganic and organic electroluminescent devices may be selected for the voltage at which they illuminate, and may be employed in a film as indicator 12 so as to illuminate to undergo a visible change when the voltage applied to the indicator crosses a predetermined value.

The present intention can be used with a dry cell battery or with a wet-cell battery and with both rechargeable and non rechargeable batteries, such as alkaline, zinc, or nickel cadmium batteries. However, for purposes of convenience, the invention has been described herein with respect to a dry-cell battery.

While the invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A battery having a battery strength tester having indicator and switching means comprising:

a battery having a first terminal and a second terminal;

a battery indicator attached to a side of said battery which undergoes a visible change when an electric current flows through the indicator and a first conductive lead electrically connected between said indicator and said first battery terminal; and a battery switch which switch when activated stays in the activated, on position for an interval during which interval there is provided an indication of the strength of the battery, which switch is disposed over the side of said battery, a second conductive lead extending from said switch to the indicator, said portion of said second conductive lead within said switch comprising a switch contact, and a conductive layer in said switch forming a switch contact and in electrical contact with said second battery terminal, said battery switch being in an electrically open position, whereby after activation of the switch to turn the switch on by electrically connecting the conductive layer and the second conductive lead so that the indicator will be placed in electrical contact across the terminals of the battery for indicating the strength of the battery, the switch automatically turns off after the interval is reached and the strength indicated, the switch automatically reverting to its open position by breaking the electrical contact across the battery terminals.

2. A battery having a battery strength tester having indicator and switching means comprising:

a dry cell battery having a first terminal and a second terminal;

a battery indicator formed in a layer attached to a side of said battery which undergoes a visible change when a current flows through the indicator and a first conductor electrically connected between said indicator and said first battery terminal; and a battery switch comprising a resilient, nonconductive, deformable layer disposed over the side of said battery, a switch chamber formed beneath said resilient layer, and a second conductor extending from said chamber and connected to the indicator, said portion of said second conductive lead within said switch chamber comprising a switch contact, and a conductive layer spaced apart from said switch contact and in electrical connection with said second battery terminal, said battery switch being in an electrically open position, whereby upon pressing of the resilient layer over said switch chamber, the switch contact will be deformed and placed in electrical contact with the conductive layer in electrical contact with said second battery terminal, thereby placing the indicator in electrical contact across the terminals of the battery and after the pressure is released, the switch stays in electrical contact for an interval or temperature during which interval the strength of the battery is indicated, after which the switch automatically breaks the electrical contact across the battery terminals.

3. The battery of claim 1 wherein said switch comprises an electronic switch.

4. The battery of claim 1 wherein said resilient layer is transparent about the chamber.

5. The battery of claim 1 wherein said resilient layer is translucent about the chamber.

6. The battery of claim 1 wherein said indicator comprises a chemical redox composition which changes color when a voltage potential across the indicator crosses a voltage.

7. The battery of claim 1 wherein said indicator comprises a liquid-crystal composition which changes phases when the electric field across the indicator exceeds a value.

8. The battery of claim 1 wherein said indicator comprises a LED which undergoes a visible change when the voltage applied to the indicator crosses a value.

9. The battery of claim 1 wherein said indicator comprises a thermochromic material which changes color when the temperature in the indicator changes to a value.

10. The battery of claim 1 wherein said indicator comprises an electroluminescent material which becomes illuminated when the switch is on, said electroluminescent material being selected from the group consisting of phosphors and organic electroluminescent compounds.

11. The battery of claim 10 wherein the electroluminescent material is a phosphor.

12. The battery of claim 10 wherein the electroluminescent material is an electrically conductive organic electroluminescent compound selected from the group consisting of crystalline electrically conductive organic compounds and polymeric electrically conductive organic compounds.

13. A battery package having a battery-strength tester having indicator and switch means comprising:

a package frame;

at least one battery mounted on said package frame, said battery having first and second terminals;

a battery-strength indicator mounted on said package frame and electrically connected to said first terminal of said battery; and a battery switch which when activated stays in the activated, on position for an interval during which interval there is provided an indication of the strength of the battery, which switch is disposed over said package frame and electrically connected to said second terminal of said battery and said indicator, said battery switch being in an electrically open position, whereby after the switch is activated to turn the switch on and said indicator is placed in electrical contact across the terminals of said battery, the switch stays in electrical contact until the interval or temperature is reached during which interval the strength of the battery is indicated, after which interval the switch automatically turns off and reverts to its open position by breaking the electrical contact across the battery terminals.

14. A battery package having a battery-strength tester having indicator and switching means comprising:

a package frame;

at least one battery mounted on said package frame, said battery having first and second terminals;

a battery-strength indicator mounted on said package frame and electrically connected to said first terminal of said battery; and a battery switch comprising a resilient, nonconductive layer disposed over said package frame, a switch chamber formed beneath said resilient layer, a first conductor extending from one end of said chamber and connected to said indicator, and a second conductor extending from the other end of said chamber and connected to said second terminal of said battery, said first conductor and second conductor forming switch contacts which are biased in an electrically open position, whereby upon pressing of the resilient layer over said switch chamber at least one of the first conductor and second conductor is physically deformed and, the first conductor and second conductor contact and place said indicator in electrical contact across the terminals of said battery for indicating the strength of the battery and after the pressure is released, the switch stays in electrical contact until an interval or temperature is reached during which interval the strength is indicated, after which interval the switch automatically breaks the electrical contact across the battery terminals.

15. A battery having a battery strength tester having indicator and switching means comprising:

a battery having a first terminal and a second terminal;

a battery indicator attached to a side of said battery which undergoes a visible change when an electric current flows through the indicator and a first conductive lead electrically connected between said indicator and said first battery terminal, said indicator comprising a phosphor compound capable of emitting light when voltage applied to the indicator crosses a predetermined value; and a battery switch disposed over the side of said battery, a second conductive lead extending from said switch to the indicator, said portion of said second conductive lead within said switch comprising a switch contact, and a conductive layer in said switch forming a switch contact and in electrical contact with said second battery terminal, said battery switch being in an electrically open position, whereby the switch may be activated by electrically connecting the conductive layer and the second conductive lead so that the indicator will be placed in electrical contact across the terminals of the battery for indicating the strength of the battery.

16. A battery having a battery strength tester having indicator and switching means comprising:

a battery having a first terminal and a second terminal;

a battery indicator attached to a side of said battery which undergoes a visible change when an electric current flows through the indicator and a first conductive lead electrically connected between said indicator and said first battery terminal, said indicator comprising an electrically conductive organic composition capable of emitting light when voltage applied to the indicator crosses a predetermined value; and a battery switch disposed over the side of said battery, a second conductive lead extending from said switch to the indicator, said portion of said second conductive lead within said switch comprising a switch contact, and a conductive layer in said switch forming a switch contact and in electrical contact with said second battery terminal, said battery switch being in an electrically open position, whereby the switch may be activated by electrically connecting the conductive layer and the second conductive lead so that the indicator will be placed in electrical contact across the terminals of the battery for indicating the strength of the battery.

* * * * *